(12) United States Patent
Ferone

(10) Patent No.: US 12,202,410 B1
(45) Date of Patent: Jan. 21, 2025

(54) SYSTEMS AND METHODS FOR DISPLAYING A FOLLOWING CAMERA IMAGE ON A LEAD VEHICLE DISPLAY DEVICE

(71) Applicant: Toyota Motor Engineering & Manufacturing North America, Inc., Plano, TX (US)

(72) Inventor: Christopher A Ferone, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/458,523

(22) Filed: Aug. 30, 2023

(51) Int. Cl.
| | | |
|---|---|---|
| *B60R 1/26* | (2022.01) | |
| *B60K 35/00* | (2024.01) | |
| *B60K 35/22* | (2024.01) | |
| *B60K 35/28* | (2024.01) | |
| *G06V 20/58* | (2022.01) | |

(52) U.S. Cl.
CPC .............. *B60R 1/26* (2022.01); *B60K 35/00* (2013.01); *G06V 20/58* (2022.01); *B60K 35/22* (2024.01); *B60K 35/28* (2024.01); *B60K 2360/176* (2024.01); *B60K 2360/21* (2024.01); *B60R 2300/105* (2013.01); *B60R 2300/607* (2013.01); *B60R 2300/8066* (2013.01)

(58) Field of Classification Search
CPC .............. B60R 1/26; B60R 2300/105; B60R 2300/607; B60R 2300/8066; B60K 35/00; B60K 35/22; B60K 35/28; B60K 2360/176; B60K 2360/21; G06V 20/58
See application file for complete search history.

(56) References Cited

U.S. PATENT DOCUMENTS

| | | |
|---|---|---|
| 8,116,921 B2 | 2/2012 | Ferrin et al. |
| 9,131,120 B2 | 9/2015 | Schofield et al. |
| 10,068,485 B2 | 9/2018 | Dudar |
| 10,254,764 B2 | 4/2019 | Laubinger et al. |
| 11,027,654 B2 | 6/2021 | Chundrlik et al. |
| 11,250,708 B2 | 2/2022 | Shimizu et al. |
| 2022/0063622 A1 | 3/2022 | Jumpertz et al. |
| 2022/0295253 A1 | 9/2022 | Hwang et al. |
| 2024/0308515 A1* | 9/2024 | Jumpertz .............. B60W 10/18 |

FOREIGN PATENT DOCUMENTS

JP      2000311300 A      11/2000

* cited by examiner

*Primary Examiner* — Farzana Hossain
(74) *Attorney, Agent, or Firm* — Christopher G. Darrow; Darrow Mustafa PC

(57) ABSTRACT

Systems, methods, and other embodiments described herein relate to a system for facilitating reverse travel of a vehicle convoy. In one embodiment, a system includes a processor and a memory storing machine-readable instructions. The machine-readable instructions, when executed by the processor, cause the processor to detect a rotational position of a steering wheel of a lead vehicle of a convoy when the lead vehicle is in a reverse mode. The machine-readable instructions, when executed by the processor, also cause the processor to select a camera of a following vehicle of the convoy based on the rotational position of the steering wheel. The machine-readable instructions, when executed by the processor, also cause the processor to display an image captured by the camera of the following vehicle on a display device of the lead vehicle.

20 Claims, 9 Drawing Sheets

SYSTEMS AND METHODS FOR DISPLAYING A FOLLOWING CAMERA IMAGE ON A LEAD VEHICLE DISPLAY DEVICE

TECHNICAL FIELD

The subject matter described herein relates, in general, to virtually connected vehicle convoys and, more particularly, to controlling the movement of the convoy vehicles as they execute a reverse maneuver.

BACKGROUND

In a hitched configuration, a vehicle, trailer, or another wheeled object is physically coupled to a motorized vehicle such that the motorized vehicle pulls the vehicle, trailer, or other wheeled object along and behind the motorized vehicle. Two vehicles may be joined in a hitchless towing or a virtual connection configuration. In a hitchless/virtual towing configuration, a lead vehicle is manually or autonomously controlled, while a following vehicle is at least partially controlled by the lead vehicle. The following vehicle trails the lead vehicle as if physically coupled to the lead vehicle. Platooning or convoying are other configurations in which multiple vehicles maneuver in a coordinated fashion. A vehicle at the front of the platoon controls the speed and/or maneuvers of the other vehicles. In general, enhancements to the operation of virtually connected vehicle convoys increase the safety, efficiency, and usability of such convoys.

SUMMARY

In one embodiment, example systems and methods relate to a manner of improving reverse travel of a virtually connected vehicle convoy.

In one embodiment, an image display system for managing the reverse movement of a virtually connected vehicle convoy is disclosed. The image display system includes one or more processors and a memory communicably coupled to the one or more processors. The memory stores instructions that, when executed by the one or more processors, cause the one or more processors to detect a rotational position of a steering wheel of a lead vehicle of a convoy when the lead vehicle is in a reverse mode, select a camera of a following vehicle of the convoy based on the rotational position of the steering wheel, and display an image captured by the camera of the following vehicle on a display device of the lead vehicle.

In one embodiment, a non-transitory computer-readable medium for managing a reverse movement of a virtually connected vehicle convoy and including instructions that, when executed by one or more processors, cause the one or more processors to perform one or more functions is disclosed. The instructions include instructions to detect a rotational position of a steering wheel of a lead vehicle of a convoy when the lead vehicle is in a reverse mode, select a camera of a following vehicle of the convoy based on the rotational position of the steering wheel, and display an image captured by the camera of the following vehicle on a display device of the lead vehicle.

In one embodiment, a method for managing a reverse movement of a virtually connected vehicle convoy is disclosed. In one embodiment, the method includes detecting a rotational position of a steering wheel of a lead vehicle of a convoy when the lead vehicle is in a reverse mode, selecting a camera of a following vehicle of the convoy based on the rotational position of the steering wheel, and displaying an image captured by the camera of the following vehicle on a display device of the lead vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
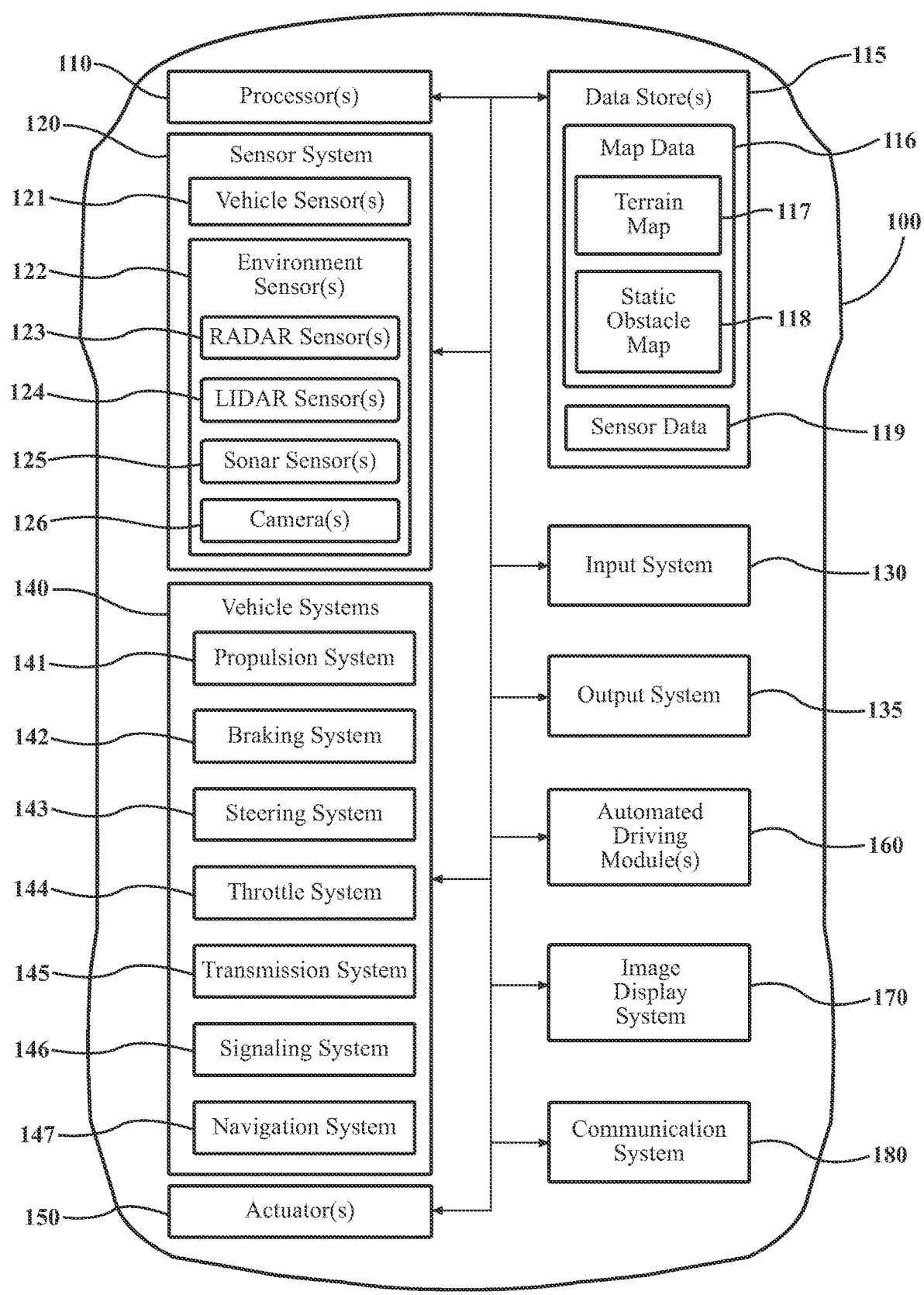
FIG. 1 illustrates one embodiment of a vehicle within which systems and methods disclosed herein may be implemented.

Systems, methods, and other embodiments associated with improving the reverse travel of a virtually connected vehicle convoy are disclosed herein. As previously described, in a convoy configuration, which may also be referred to as a hitchless towing, a virtual towing, a platooning, or a virtual connection configuration, a lead vehicle is manually or autonomously controlled, while a following vehicle is at least partially controlled by the lead vehicle. That is, the following vehicle may trail the lead vehicle as if physically coupled to the lead vehicle. As such, the following vehicle and the lead vehicle exhibit coordinated movements.

However, the lead vehicle/following vehicle relationship complicates certain vehicular maneuvers, such as traveling in a reverse direction. To aid in reverse maneuvers, a vehicle includes a backup camera located on the rear portion of the vehicle. The backup camera provides the driver with a view of the environment behind the vehicle such that the driver may see any obstacles along or near the reverse trajectory. However, when virtually connected vehicles are reversing, a lead vehicle's backup camera will be occluded by the presence of the following vehicle. Moreover, while reversing a vehicle convoy, the last vehicle of the convoy may be directly controlled by the driver, who remains in the lead vehicle, while other vehicles in the convoy autonomously track the last vehicle's movement. In this example, the driver, still in the lead vehicle, controls the movement of the last following vehicle using the inputs (e.g., steering wheel, brake pedal, accelerator pedal) of the lead vehicle. Note that in this example, the manipulation of the lead vehicle input devices does not directly control the movement of the lead vehicle. Instead, the lead vehicle simply tracks the last vehicle's position. In this example, the lead vehicle backup camera, which the lead driver may rely on when backing up, would be blocked by the other vehicles in the convoy. As such, the driver does not have a clear view of the environment behind the convoy through which the convoy is to travel. A driver may become nervous or uncomfortable due to the lack of a clear view while reversing. This occluded field of view and increased nervousness/anxiety could lead to a dangerous collision with an object/person behind the convoy that the driver does not see.

Accordingly, the present image display system displays, on a display device of a lead vehicle, images captured from cameras of a following vehicle. Specifically, the image display system displays images from a camera of the following vehicle that corresponds to the direction the following vehicle is traveling. In this example, the image display system determines a steering wheel rotational position of the lead vehicle and selects a camera from the following vehicle that is capturing a portion of the environment of the convoy that the lead driver expects to see based on the determined steering wheel rotational position. For example, if the driver rotates the steering wheel of the lead vehicle in a counterclockwise or leftward direction, a left-side camera of the following vehicle is selected. By comparison, if the driver rotates the steering wheel of the lead vehicle in a clockwise or rightward direction, a right-side camera of the following vehicle is selected. In either case, the selected camera image is presented on a display device of the lead vehicle so that the driver has a view of the most relevant environment to the particular reverse maneuver (e.g., leftward reverse and rightward reverse, among others).

In this way, the disclosed systems, methods, and other embodiments improve convoy travel by providing backup assistance to a driver in the lead vehicle by presenting images from following vehicle cameras, which are unobstructed by other vehicles in the convoy. Thus, the lead driver may have increased comfort in directing the convoy's reverse maneuver given the clear field of view of the rearward environment of the convoy.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment, and thus benefits from the functionality discussed herein associated with managing reverse convoy movement.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes an image display system 170 that is implemented to perform methods and other functions as disclosed herein relating to improving reverse convoy movement.

The image display system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the image display system 170 can leverage various wireless communication technologies to provide communications to other entities, such as members of the cloud-computing environment.

Figure 2:
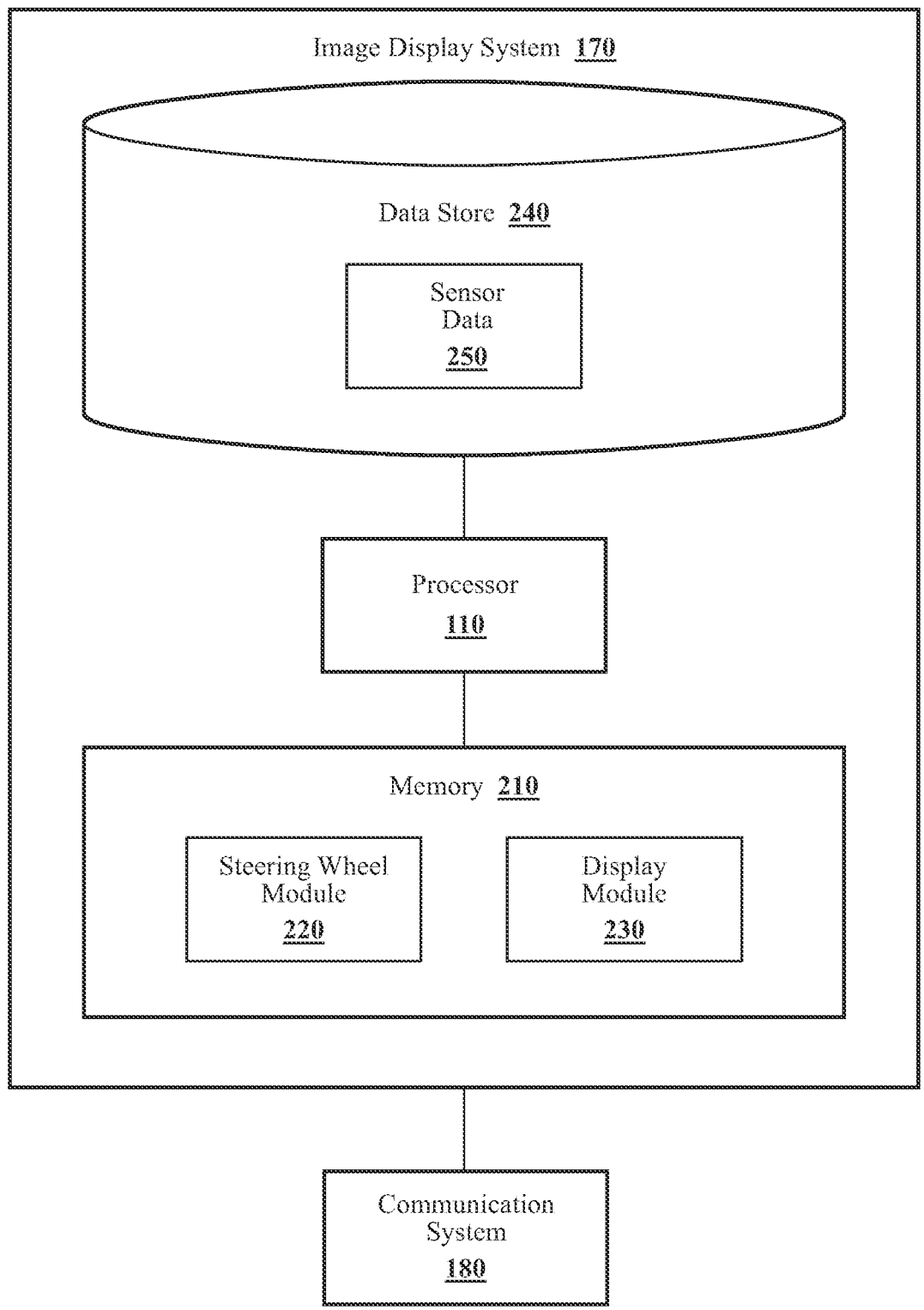
FIG. 2 illustrates one embodiment of an image display system that is associated with managing vehicle convoy reverse maneuvers.

With reference to FIG. 2, one embodiment of the image display system 170 of FIG. 1 is further illustrated. The image display system 170 is shown as including a processor 110 from the vehicle 100 of FIG. 1. Accordingly, the processor 110 may be a part of the image display system 170, the image display system 170 may include a separate processor from the processor 110 of the vehicle 100, or the image display system 170 may access the processor 110 through a data bus or another communication path that is separate from the vehicle 100. In one embodiment, the image display system 170 includes a memory 210 that stores a steering wheel module 220 and a display module 230. The memory 210 is a random-access memory (RAM), read-only memory (ROM), a hard-disk drive, a flash memory, or another suitable memory for storing the modules 220 and 230. The modules 220 and 230 are, for example, computer-readable instructions that when executed by the processor 110 cause the processor 110 to perform the various functions disclosed herein. In alternative arrangements, the modules 220 and 230 are independent elements from the memory 210 that are, for example, comprised of hardware elements. Thus, the modules 220 and 230 are alternatively ASICs, hardware-based controllers, a composition of logic gates, or another hardware-based solution.

Moreover, in one embodiment, the image display system 170 includes the data store 240. The data store 240 is, in one embodiment, an electronic data structure stored in the memory 210 or another data storage device and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 stores the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on.

The sensor data 250 may include data indicative of a rotational position of a steering wheel of the lead vehicle. That is, a driver rotates the steering wheel of the vehicle 100 to effectuate a turning of the tires to navigate the vehicle 100 in a particular direction. In the case of reversing a convoy of virtually connected vehicles, a lead vehicle driver may turn the steering wheel of the lead vehicle to turn the tires of the following vehicle. As such, the vehicle 100, which may be a lead vehicle of a convoy, includes a steering wheel position sensor that monitors the angle of the steering input in degrees. The steering wheel position sensor may use a number of mechanisms to detect the rotational position of the steering wheel. For example, the steering wheel position sensor may be an analog sensor that measures voltage differences to determine the angle of the steering wheel. In another example, the steering wheel position sensor may be a digital sensor that uses light to measure the angle of the steering input. In any case, the steering wheel position sensor output may be a rotational position of the steering wheel from a central position. For example, the steering wheel position sensor may indicate that the steering wheel is in a leftward or rightward position. While particular reference is made to particular steering wheel position sensor mechanisms, the steering wheel position sensor of the present specification may rely on various mechanisms to determine the rotational position of the steering wheel.

As described above, the image display system 170 relies on a measurement of the steering wheel rotational position when determining which camera of the following vehicle to display on the display device of the lead vehicle. As such, the sensor data 250 includes the steering wheel rotational positional measurements collected from the steering wheel position sensor.

The sensor data 250 also includes information collected from various environment sensors such as radar sensors 123, LiDAR sensors 124, sonar sensors 125, and cameras 126 that are disposed on the vehicle 100. As described above, the outputs of these sensors are presented on a display device of the vehicle 100 to aid in vehicle navigation. As a particular example, camera images of the environment surrounding the vehicle are presented on the lead vehicle display device. When reversing, the output collected by side/rearview cameras is presented on the display device. As such, the sensor data 250 includes the output data from cameras 126 of the vehicle 100 as well as the output data of other sensors.

As described above, the output of a lead vehicle backup camera may be blocked by the presence of a following vehicle, which blockage may render reverse movement more difficult as a driver is doing so without a clear view of the environment behind the convoy. As such, the sensor data 250 includes environment sensor 122 output collected from the following vehicle, which environment sensor 122 output may be unobscured by other vehicles in the convoy. That is, the vehicle 100, which may be a lead vehicle, includes a communication system 180 that allows the vehicles in a convoy to communicate. Through this communication system 180, environment sensor 122 data from a following vehicle is passed to the lead vehicle and stored in the data store 240 as sensor data 250.

The sensor data 250 also includes environment sensor 122 data from the lead vehicle. As described below, in some examples the displayed image is a stitched, merged, or combined image formed from data collected from environment sensors 122 of the lead vehicle and environment sensors 122 of the following vehicle. As such, the sensor data 250 includes environment sensor output, such as camera images, from both the lead vehicle and the following vehicle so that the stitched images may be generated. Additional detail regarding image stitching, merging, or combining images is presented below in connection with FIGS. 7-9.

The image display system 170 includes a steering wheel module 220 that, in one embodiment, includes instructions that cause the processor 110 to detect a rotational position of a steering wheel of a lead vehicle of a convoy when the lead vehicle is in a reverse mode. As such, the steering wheel module 220 generally includes instructions that function to control the processor 110 to receive data inputs from one or more sensors of the vehicle 100. As provided for herein, the steering wheel module 220, in one embodiment, acquires sensor data 250 that includes at least an output of a steering wheel position sensor, which indicates a rotational position of the steering wheel. For example, the steering wheel position sensor may determine whether the steering wheel is in a leftward or rightward position relative to a central position of the steering wheel.

Accordingly, the steering wheel module 220, in one embodiment, controls the respective sensors to provide the data inputs in the form of the sensor data 250. Additionally, while the steering wheel module 220 is discussed as controlling the various sensors to provide the sensor data 250, in one or more embodiments, the steering wheel module 220 can employ other techniques to acquire the sensor data 250 that are either active or passive. For example, the steering wheel module 220 may passively sniff the sensor data 250 from a stream of electronic information provided by the various sensors to further components within the vehicle 100. Moreover, the steering wheel module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

From the acquired sensor data 250, and specifically the steering wheel rotational position data, the steering wheel module 220 determines the rotational position of the steering wheel of the lead vehicle in the convoy. As described above, in an example, the lead vehicle controls the following vehicle using a drive-by-wire system where the driver in the lead vehicle operates the input devices (e.g., steering wheel, accelerator pedal, brake pedal, etc.) to directly control the following vehicle, while the lead vehicle is not directly controlled by these inputs, but rather autonomously follows the movement of the following vehicle. As such, the manipulation of the steering wheel of the lead vehicle turns the following vehicle wheel to guide the following vehicle and the autonomously following vehicles of the convoy in a particular direction. Accordingly, based on the steering wheel position, the steering wheel module 220 identifies the intended direction of reverse travel of the following vehicle and the entire convoy.

This identified directional position of the steering wheel, as determined by the steering wheel module 220, is transmitted to the display module 230 for the selection of a particular camera of the following vehicle and presentation of the output of the selected camera on a display device of the lead vehicle.

In one approach, the steering wheel module 220 implements and/or otherwise uses a machine learning algorithm. In one configuration, the machine learning algorithm is embedded within the steering wheel module 220, such as a convolutional neural network (CNN), to perform rotational position detection over the sensor data 250 from which further information is derived. Of course, in further aspects, the steering wheel module 220 may employ different machine learning algorithms or implement different approaches for performing the rotational position determination which can include deep convolutional encoder-decoder architectures, a multi-scale context aggregation approach using dilated convolutions, or another suitable approach that generates a rotational position indication for the steering wheel of the lead vehicle. Whichever particular approach the steering wheel module 220 implements, the steering wheel module 220 provides an output of rotational position. In this way, the steering wheel module 220 provides the display module 230 with an indication by which the display module 230 may select a particular following vehicle camera image to display on a display device of the lead vehicle.

The image display system 170 includes a display module 230 that, in one embodiment, includes instructions that cause the processor 110 to select a camera of a following vehicle of the convoy based on the rotational position of the steering wheel of the lead vehicle and displays an image captured by the selected camera of the following vehicle on a display device of the lead vehicle. That is, as the following vehicle obscures a view of the lead vehicle backup camera, the image display system 170 presents an image collected by cameras of the following vehicle, which is unobscured by any vehicle in the convoy and thus clearly depicts the projected trajectory of the convoy in the reverse direction.

Accordingly, the display module 230 generally includes instructions that function to control the processor 110 to receive data inputs from one or more sensors of the vehicles, both the lead vehicle and the following vehicle, of the convoy. The inputs are, in one embodiment, observations of one or more objects in an environment proximate to the vehicles and/or other aspects about the surroundings. As provided for herein, the display module 230, in one embodiment, acquires sensor data 250 that includes at least camera images from the following vehicle. In further arrangements, the display module 230 acquires the sensor data 250 from further sensors such as a radar sensor 123, a LiDAR sensor 124, and other sensors as may be suitable for identifying vehicles and locations of the vehicles. As described above, the sensor data 250, in an example, includes images from the lead vehicle camera(s) such that images from the lead vehicle and the following vehicle may be stitched, merged, or combined to present a greater field of view to the driver who is in the lead vehicle and controlling the reversing convoy.

Accordingly, the display module 230, in one embodiment, controls the respective sensors to provide the data inputs in the form of the sensor data 250. As described, such sensor data 250 may be from the following vehicle and/or the lead vehicle in the case where image stitching occurs.

Additionally, while the display module 230 is discussed as controlling the various sensors to provide the sensor data 250, in one or more embodiments, the display module 230 can employ other techniques to acquire the sensor data 250 that are either active or passive. For example, the display module 230 may passively sniff the sensor data 250 from a stream of electronic information provided by the various sensors to further components within the vehicle 100. Moreover, the display module 230 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

The sensor data 250 may include, for example, information about the environment of the convoy and so on. Moreover, the display module 230, in one embodiment, controls the sensors to acquire the sensor data 250 about an area that encompasses 360 degrees about the vehicles in the convoy in order to provide a comprehensive assessment of the surrounding environment.

As described above, from the identified rotational position of the steering wheel of the lead vehicle, the display module 230 selects a camera of the following vehicle, an output of which is to be displayed on the lead vehicle display device. That is, the steering wheel module 220 and the display module 230 may be operatively coupled such that the output of the steering wheel module 220, i.e., the rotational position of the steering wheel, is transmitted to the display module 230.

In an example, the display module 230 selects a camera of the following vehicle that matches the rotational position of the steering wheel of the lead vehicle. For example, when the lead vehicle steering wheel is turned towards the left, i.e., counterclockwise, the display module 230 selects a camera of the following vehicle which depicts a leftward environment of the convoy. Similarly, when the lead vehicle steering wheel is turned towards the right, i.e., clockwise, the display module 230 selects a camera of the following vehicle which depicts a rightward environment of the convoy. In either case, the lead vehicle driver, rather than viewing a view of the environment obscured by the following vehicle (i.e., from a backup camera of the lead vehicle), sees the side environment of the convoy, which aids in the reverse navigation of the convoy.

In an example, the display module 230 selects multiple cameras of the following vehicle. For example, as described below in connection with FIG. 8, it may be that multiple following camera images may be stitched together to provide a wider field of view of the environment. In this example, the display module 230 selects multiple cameras based on the rotational position of the steering wheel of the lead vehicle. In any case, the selection of a following vehicle camera includes activating a particular camera of the following vehicle or transmitting the output of that particular camera to a display device of the lead vehicle via the respective communication systems 180 of the vehicles. Other non-selected cameras may be inactive or may be active but not have their input actively transmitted to the lead vehicle display device.

The display module 230 also displays the images of the selected cameras on the display device of the lead vehicle. That is, the lead vehicle may include a display device such as a multimedia display device, an augmented reality (AR) display device, a tablet, an infotainment center, a heads-up display, or any other of a variety of display devices. The output collected by the selected camera is presented on the aforementioned display device. In an example, the image may be a video feed captured by the selected camera.

The images of the selected following vehicle camera may be presented alongside images captured by a lead vehicle camera. In other examples as described above, multiple images/video streams may be stitched, merged, or otherwise combined into a single image/video stream. Such stitching or merging may be of images from multiple following vehicle cameras. For example, when the following vehicle, under the direction of the lead vehicle, is reversing to the left, the display module 230 may stitch together images from a left-side camera of the following vehicle and a rear camera of the following vehicle, thus providing an even larger field of view in the immediate vicinity of the reversing direction.

In another example, the stitching or merging may be of images from the following vehicle camera and the lead vehicle camera. For example, when the following vehicle, under the direction of the lead vehicle, is reversing to the right, the display module 230 may stitch together images from a right-side camera of the following vehicle and a right-side camera of the lead vehicle, thus providing an even larger field of view in the immediate vicinity of the reversing direction. In either case, the display module 230 may include instructions that, when executed by the processor, cause the processor 110 to merge images, for example relying on pixel analysis to identify similar objects within overlapping fields of view and combine the images.

In one approach, the display module 230 implements and/or otherwise uses a machine learning algorithm. In one configuration, the machine learning algorithm is embedded within the display module 230, such as a convolutional neural network (CNN), to perform camera selection, image display, and/or image stitching. Of course, in further aspects, the display module 230 may employ different machine learning algorithms or implements different approaches for performing the camera selection, image display, and/or image stitching which can include deep convolutional encoder-decoder architectures, a multi-scale context aggregation approach using dilated convolutions, or another suitable approach that generates images for display on a display device of the lead vehicle. Whichever particular approach the display module 230 implements, the display module 230 provides an image output on a display device of a lead vehicle. In this way, the display module 230 presents images on a display device of a lead vehicle that depict the immediate vicinity of the convoy as it travels in a reverse direction.

In one or more configurations, the image display system 170 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is the image display system 170 or another system generally trains the machine learning algorithm according to a particular training approach, which may include supervised training, self-supervised training, reinforcement learning, and so on. In contrast to training/learning of the machine learning algorithm, the image display system 170 implements the machine learning algorithm to perform inference. Thus, the general use of the machine learning algorithm is described as inference.

Figure 3:
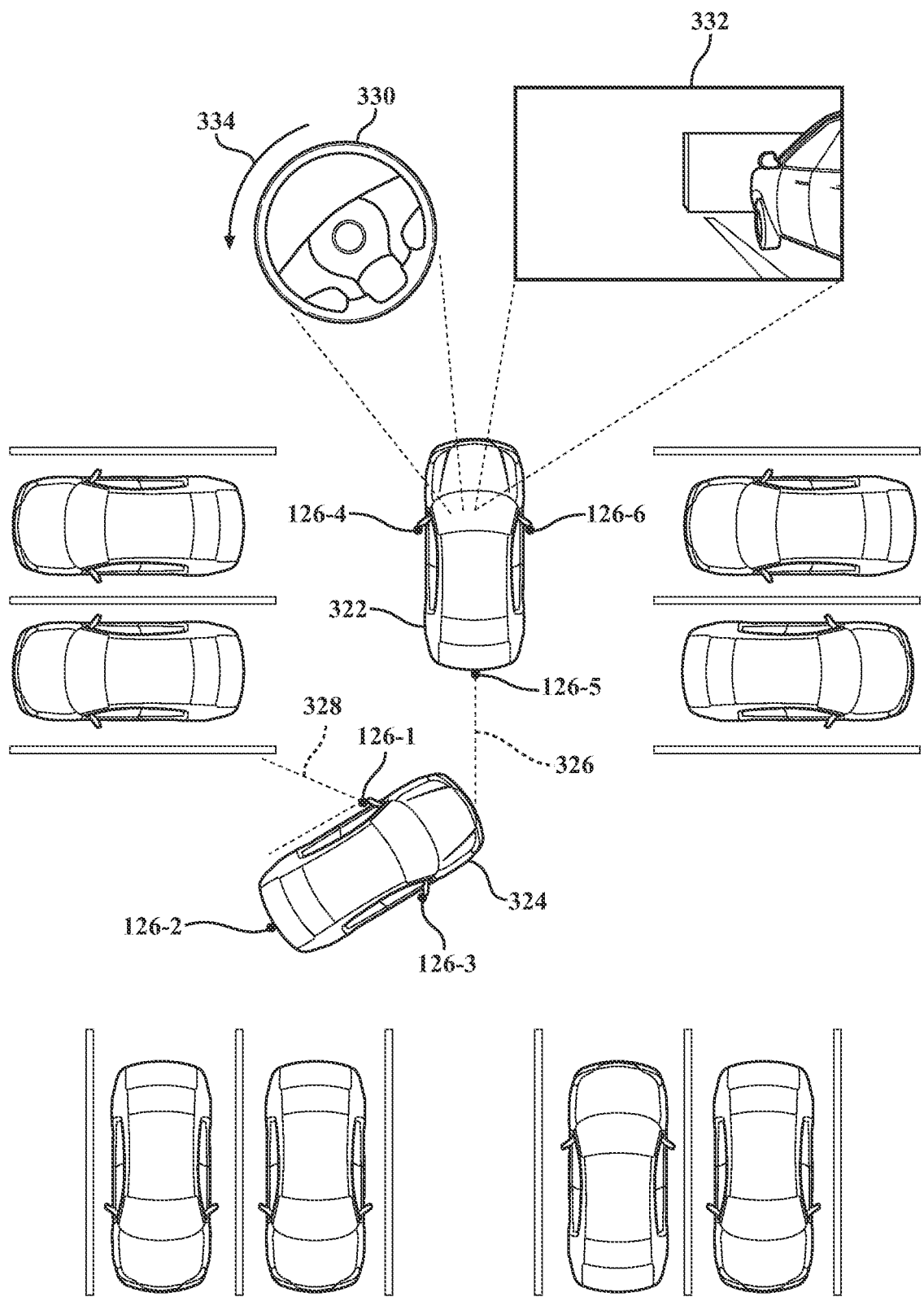
FIG. 3 illustrates one embodiment of the image display system managing a vehicle convoy executing a leftward reverse maneuver.

FIG. 3 illustrates one embodiment of the image display system 170 managing a vehicle convoy executing a leftward reverse maneuver. As described above, a lead vehicle 322 and a following vehicle 324 may be in a convoy, exhibiting coordinated movement. In this example, the lead vehicle 322 at least partially controls the movement of the following vehicle 324 via a virtual connection 326. Specifically, inputs received at lead vehicle input devices (e.g., steering wheel, brake pedal, accelerator pedal) operate the systems (e.g., propulsion system, braking system, steering system) of the following vehicle 324. Via this virtual connection 326, information is passed between the vehicles via the communication system 180 disposed within each vehicle. As such, the lead vehicle 322 and the following vehicle 324 are examples of the vehicle 100 described above and may include any variety of the components depicted in FIG. 1 and described in the associated text.

Both the lead vehicle 322 and the following vehicle 324 include a number of cameras 126-1, 126-2, 126-3, 126-4, 126-5, 126-6 that capture images of a surrounding environment (e.g., external) of the respective vehicles. However, the lead vehicle 322 backup camera is partially obscured by the following vehicle 324, which may lead to a potential collision of a vehicle of the convoy with an object/person behind the convoy were the driver to rely on the images from the lead vehicle backup camera 126-5. Moreover, the backup camera 126-5 of the lead vehicle 322 does not capture the immediate vicinity of the rearward travel direction of the following vehicle 324. As such, the image display system 170 addresses this shortcoming by selecting the following vehicle 324 camera view to display on the display device 332 of the lead vehicle 322. Specifically, based on the detected rotational position of the steering wheel 330 of the lead vehicle 322, the display module 230 selects a particular camera of the following vehicle 324 and displays an output of that particular camera on the display device 332 of the lead vehicle 322. For example, as depicted in FIG. 3, when the steering wheel 330 of the lead vehicle 322 is in a leftward position as indicated by the arrow 334 and as detected by the steering wheel module 230, the display module 230 selects a left-side camera 126-1 of the following vehicle 324, which left side camera 126-1 has a left side field of view 328. As described above, this left side camera 126-1 output is transmitted to the lead vehicle 322 via the communication systems 180 of the respective vehicles and presented on the display device 332 of the lead vehicle 322. In the example depicted in FIGS. 7 and 8, the content presented on the display device 332 may be stitched, merged, or otherwise combined with images from multiple cameras. Note that while FIG. 3 depicts side cameras disposed on the side view mirrors of the following vehicle 324; the side cameras may be disposed at other locations, including the B-pillars, panels of the following vehicle 324, or other locations of the following vehicle 324.

Figure 4:
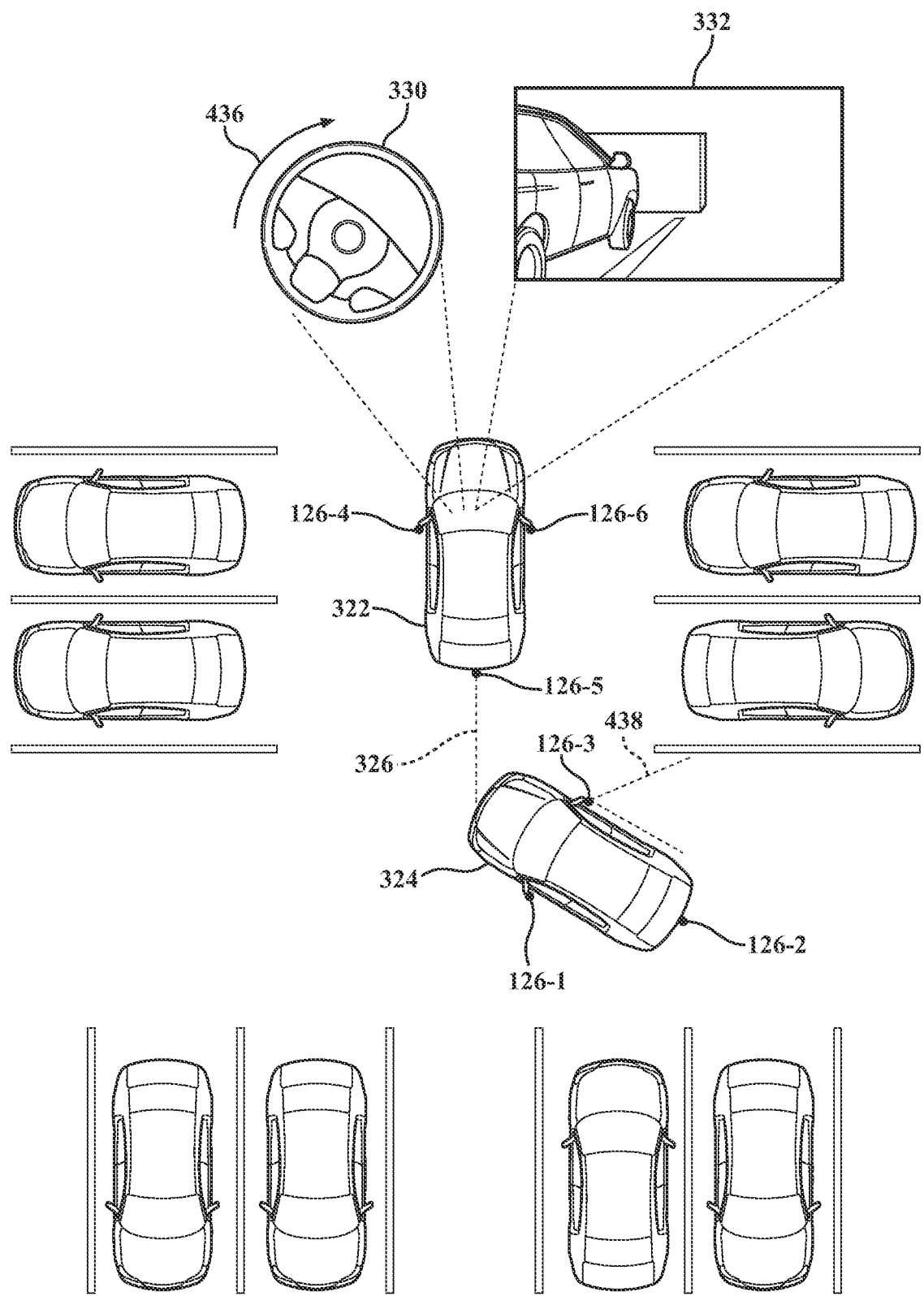
FIG. 4 illustrates one embodiment of the image display system managing a vehicle convoy executing a rightward reverse maneuver.

FIG. 4 illustrates one embodiment of the image display system 170 managing a vehicle convoy executing a rightward reverse maneuver. In the example depicted in FIG. 4, when the steering wheel 330 of the lead vehicle 322 is in a rightward position as indicated by the arrow 436, and as detected by the steering wheel module 230, the display module 230 selects a right-side camera 126-3 of the following vehicle 324, which right side camera 126-3 has a right side field of view 438. As described above, this right side camera 126-3 output is transmitted to the lead vehicle 322 via the communication systems 180 of the respective vehicles and presented on the display device 332 of the lead vehicle 322.

Figure 5:
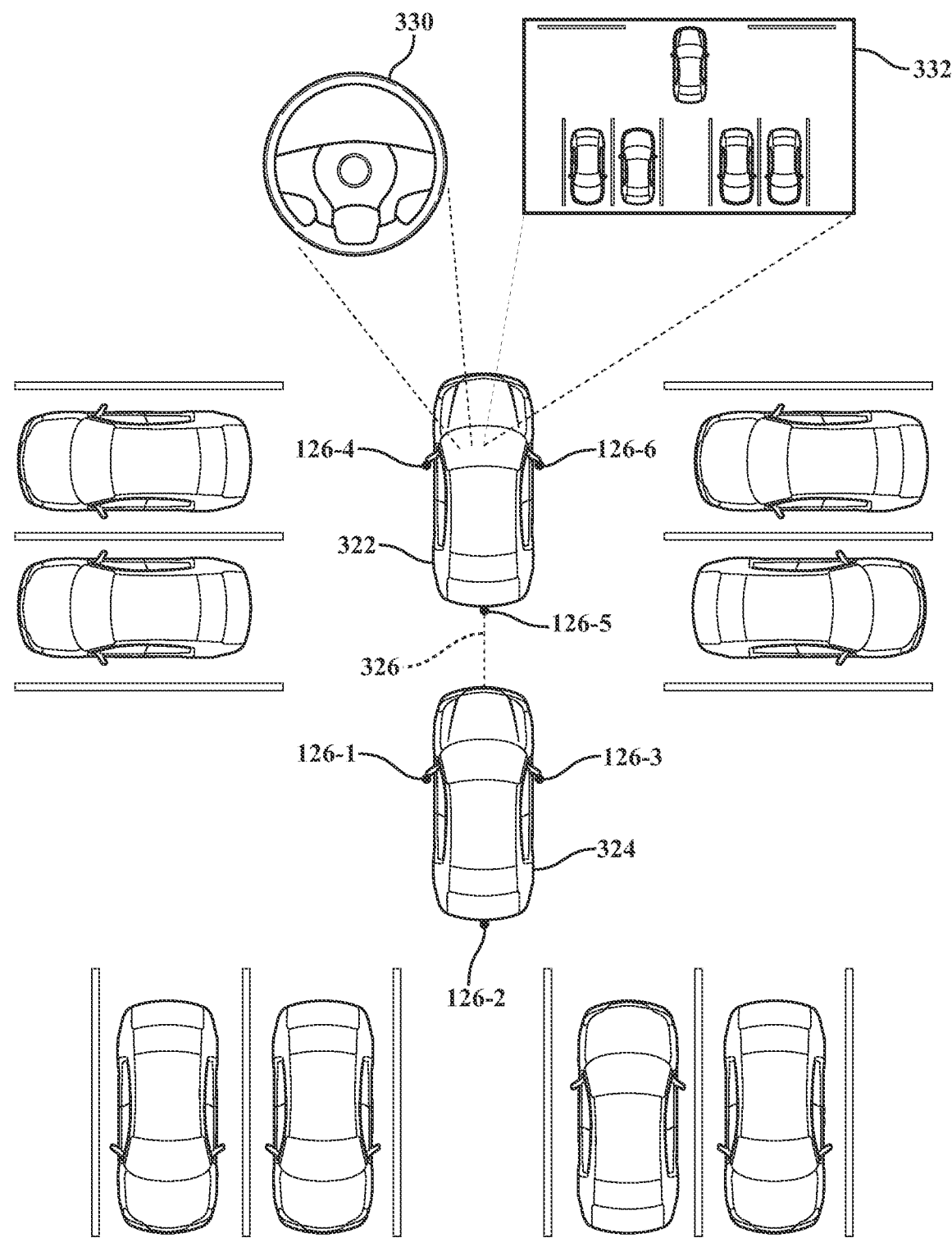
FIG. 5 illustrates one embodiment of the image display system managing a vehicle convoy executing a straight reverse maneuver.

FIG. 5 illustrates one embodiment of the image display system managing a vehicle convoy executing a straight reverse maneuver. As described above, in certain situations, rather than relying on the output of one camera 126, the image display system 170 may stitch together various images to generate a wider field of view of the environment. In one example, when the steering wheel 330 of the lead vehicle 322 is in a central position, and as detected by the steering wheel module 220, the display module 230 selects multiple following vehicle cameras 126-1, 126-2, 126-3. The display module 230 may then generate and display a top view of the convoy based on the images from the multiple following vehicle cameras 126-1, 126-2, 126-3. A top view, or birds-eye view of the convoy is generated by processing images from multiple following vehicle cameras 126-1, 126-2, 126-3. That is, the display module 230 includes an image-processing module that analyzes the various camera outputs and knits the images together, accounting for any image parallax to generate a synthetic but dimensionally accurate representation of the following vehicle 324 as viewed from above the following vehicle 324. As such, a driver of the lead vehicle is provided with a top view of the following vehicle 324, which may aid in the navigation of the following vehicle 324 and autonomously following convoy in a straight back direction.

Figure 6:
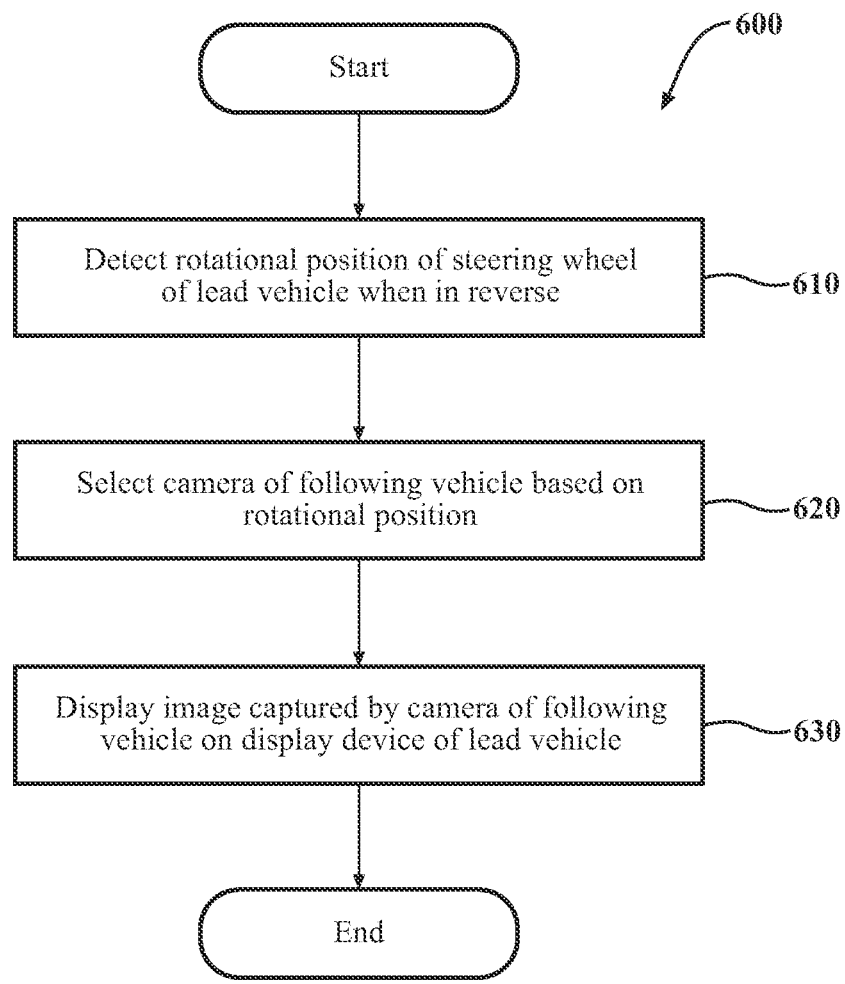
FIG. 6 illustrates a flowchart for one embodiment of a method that is associated with managing a vehicle convoy to execute a reverse maneuver.

FIG. 6 illustrates a flowchart of a method 600 that is associated with controlling the reverse travel of a vehicle convoy. Method 600 will be discussed from the perspective of the image display system 170 of FIGS. 1 and 2. While method 600 is discussed in combination with the image display system 170, it should be appreciated that the method 600 is not limited to being implemented within the image display system 170 but is instead one example of a system that may implement the method 600.

At 610, the steering wheel module 220 detects a rotational position of a steering wheel 330 of the lead vehicle 322 of a convoy when the lead vehicle 322 is in a reverse mode. That is, input received at the lead vehicle 322 input devices directs the following vehicle 324 while the convoy is in a reverse mode. In an example, the lead vehicle 322 includes a steering wheel position sensor that detects the rotational position (e.g., left, right, or centered). As the steering wheel rotational position is used to control the tires of the following vehicle 324, the steering wheel rotational position is indicative of a reverse direction of the following vehicle 324.

As such, the steering wheel module 220 controls the sensor system 120 to acquire the sensor data 250. Moreover, in further embodiments, the steering wheel module 220 controls the sensors to acquire the sensor data 250 at successive iterations or time steps. Thus, the image display system 170, in one embodiment, iteratively executes the functions discussed at blocks 610-630 to acquire the sensor data 250 and provide information therefrom. Furthermore, the steering wheel module 220, in one embodiment, executes one or more of the noted functions in parallel for separate observations in order to maintain updated perceptions.

At 620, the display module 230 selects cameras 126-1, 126-2, 126-3 of the following vehicle 324 based on the rotational position of the steering wheel 330. That is, the display module 230 activates a camera of the following vehicle 324 or transmits an output of a camera of the following vehicle 324 to the lead vehicle 322, based on the rotational position of the lead vehicle 322 steering wheel 330. For example, if the convoy is reversing in a leftward direction, a left side camera 126-1 of the following vehicle 324 is selected. By comparison, if the convoy is reversing in a rightward direction, a right-side camera 126-3 of the following vehicle 324 is selected. In some examples, multiple cameras are selected. For example, if the convoy is reversing in a straight direction, multiple following vehicle 324 cameras are selected, the output of which is ultimately stitched together into one single top-view image of the convoy. Doing so ensures that the driver is presented with a field of view of the vicinity of the convoy that is unblocked by vehicles in the convoy.

At 630, the display module 230 displays an image captured by the camera of the following vehicle 324 on a display device 332 of the lead vehicle 322. As such, the display module 230 controls the sensor system 120 of the lead vehicle 322 and the following vehicle 324 to acquire the sensor data 250, specifically the camera images from the vehicles. In one embodiment, the display module 230 controls the radar sensor 123 and the camera 126 of the vehicles to observe the surrounding environment. Alternatively, or additionally, the display module 230 controls the camera 126 and the LiDAR sensor 124 or another set of sensors to acquire the sensor data 250. As part of controlling the sensors to acquire the sensor data 250, it is generally understood that the sensors acquire the sensor data 250 of a region around the vehicles with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the display module 230, in one embodiment, controls the sensors to acquire the sensor data 250 of the surrounding environment.

Moreover, in further embodiments, the display module 230 controls the sensors to acquire the sensor data 250 at successive iterations or time steps. Thus, as described above, the image display system 170, in one embodiment, iteratively executes the functions discussed at blocks 610-630 to acquire the sensor data 250 and provide information therefrom. Furthermore, the display module 230, in one embodiment, executes one or more of the noted functions in parallel for separate observations in order to maintain updated perceptions. Additionally, as previously noted, the display module 230, when acquiring data from multiple sensors, fuses the data together to form the sensor data 250 and to provide for improved determinations of detection, location, and so on.

Based on the acquired camera or other sensor output, the display module 230 outputs the captured output on the display device 332 of the lead vehicle 322 such that the driver of the lead vehicle 322 may view the environment in the immediate vicinity behind the reversing convoy. As such, a clear view of the reversing environment is presented to the driver of the lead vehicle 322 so that the driver may navigate the convoy to avoid any objects/people.

Figure 7:
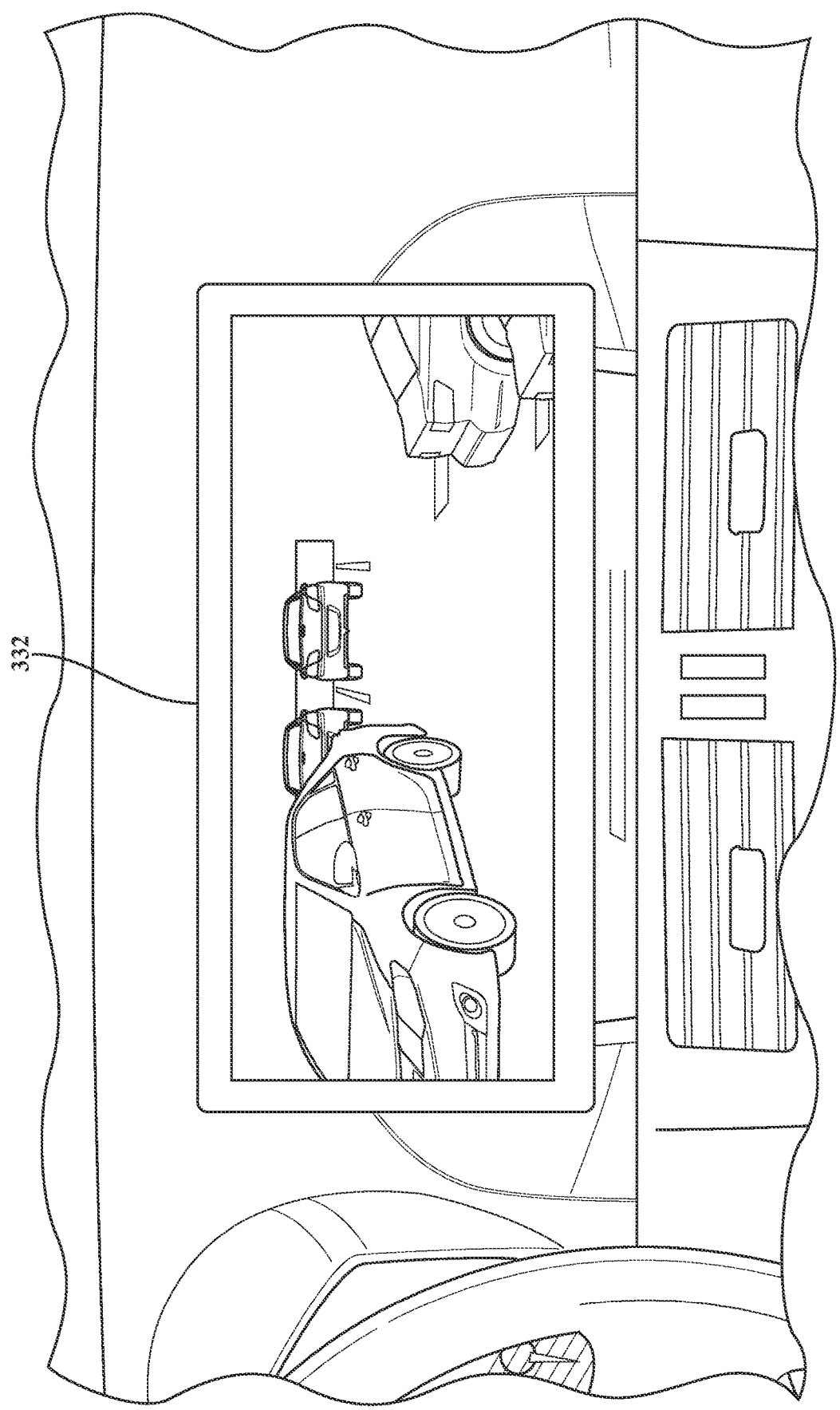
FIG. 7 illustrates an example display device that presents a lead vehicle/following vehicle stitched image.

FIG. 7 illustrates an example display device 332 that presents a lead vehicle/following vehicle stitched image. As described above, in some examples, multiple images may be stitched, merged, or otherwise combined to present a wider field of view on the display device 332. As such, the display module 230 may combine the images captured by the camera of the following vehicle 324 with an image captured by a lead vehicle 322 camera into a single image. For example, the display device 332 depicted in FIG. 7 represents a combination of the field of view of the left side camera 126-4 of the lead vehicle 322 with the field of view of the left side camera 126-1 of the following vehicle 324. It is noted that the image processor may account for the differing perspectives, angles, etc. of the images collected by each camera to generate a single consistent image of the environment. That is, the image processor may account for distortion, parallax, etc., exhibited between the various images stitched together. Thus, a wider view of the environment surrounding the vehicles while performing the reverse maneuver is presented to the driver via the display device 332.

In addition to providing a wider field of view, vehicle images may be stitched for other reasons. For example, it may be the case that one vehicle's cameras have a higher resolution than others. Accordingly, by stitching images together as described above, at least a part of the resultant display on the display device 332 is at a higher resolution. Moreover, it may be the case that certain objects obscure the field of view of at least one vehicle camera but not another. As such, the display module 230 may include an image processor that, using both images, can remove obscuring objects identified in one image that are not found in another image, thus providing a clear and unobstructed stitched image. In this example, the image processor may compensate for differences in distances between the vehicles to merge the images and present accurate dimensional reproduction of the objects within the image. That is, in stitching the images together, the display module 230 may scale, rotate, skew, or otherwise adjust either image to present a dimensionally and geometrically consistent representation of the environment.

Figure 8:
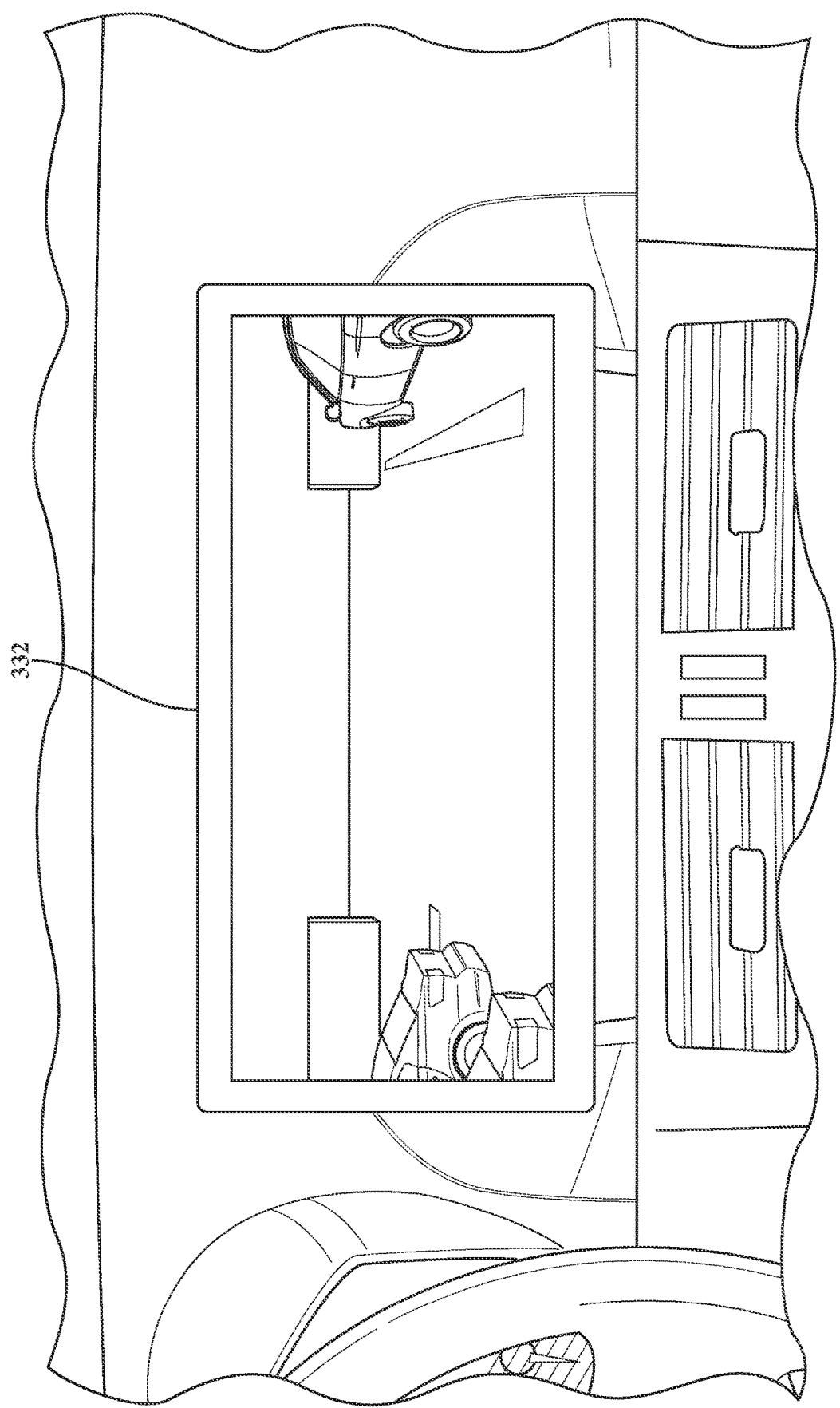
FIG. 8 illustrates an example display device that presents a stitched image from multiple following vehicle cameras.

FIG. 8 illustrates an example display device that presents a stitched image from multiple following vehicle 324 cameras. As described above, in some examples, the display module 230 selects multiple cameras from the following vehicle 324 and stitches, merges, or otherwise combines the images of these multiple following vehicle 324 cameras into a single image to present a wider field of view on the display device 332. For example, the display device 332 depicted in FIG. 8 represents a combination of the images captured by the left side camera 126-1 of the following vehicle 324 with the images captured by the rear camera 126-2 of the following vehicle 324. Thus, a wider view of the environment surrounding the vehicles while performing the reverse maneuver is presented to the driver via the display device 332. While FIGS. 7 and 8 depict particular examples of stitched camera images. Other combinations of images may be stitched together to generate a wider field of view of the environment to aid the convoy manager in directing the convoy in a reverse direction.

Figure 9:
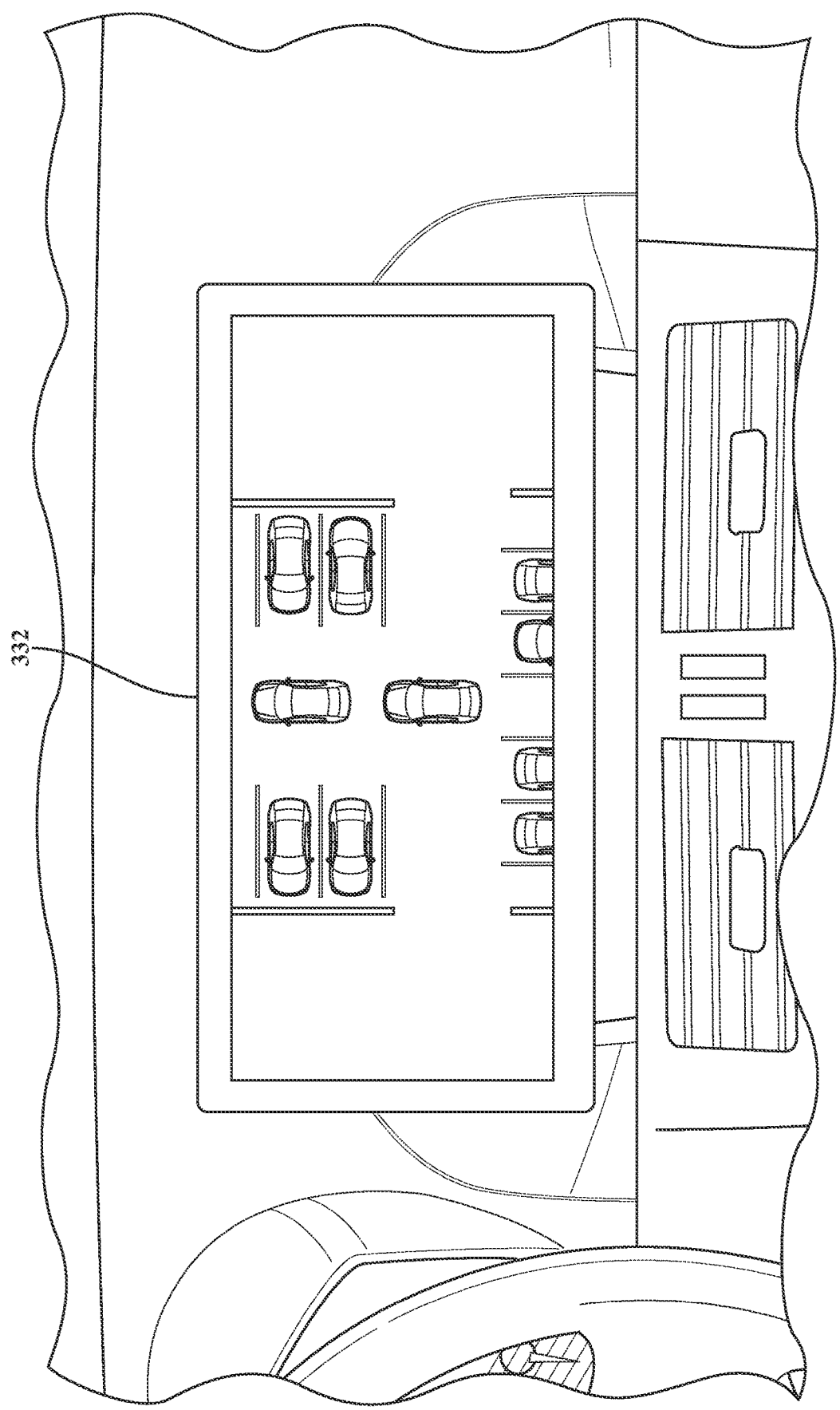
FIG. 9 illustrates an example display device that presents a lead vehicle/following vehicle stitched top view image.

FIG. 9 illustrates an example display device 332 that presents a lead vehicle/following vehicle stitched top view image. As described above, the display module 230 may present a wider field of view of the convoy environment by stitching multiple images together. In the example depicted in FIG. 9, the display module 230 image processor combines images captured by multiple following vehicle 324 cameras with images captured by multiple lead vehicle 322 cameras into a single top view image. That is, the display module 230 includes an image processor that receives as input images from multiple cameras of each of the lead vehicle 322 and the following vehicle 324 and processes them in order to generate a birds-eye view of the vehicle convoy. Thus, a wider top view of the convoy is presented to the convoy manager to facilitate efficient and safe convoy reverse travel.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor (s) 110. In general, the data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. Thus, the sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide connection to a global positioning system, a local positioning system or a geolocation system.

In one or more configurations, the vehicle systems 140 function cooperatively with other components of the vehicle 100. For example, the processor(s) 110, the image display system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the image display system 170, and/or the automated driving module(s) 160 may control some or all of these vehicle systems 140.

For example, when operating in the autonomous mode, the processor(s) 110, the image display system 170, and/or the automated driving module(s) 160 control the heading and speed of the vehicle 100. The processor(s) 110, the image display system 170, and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 150 in at least one configuration. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 either independently or in combination with the image display system 170 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
    a processor; and
    a memory storing machine-readable instructions that, when executed by the processor, cause the processor to:
        detect a rotational position of a steering wheel of a lead vehicle of a convoy when the lead vehicle is in a reverse mode;
        select a camera of a following vehicle of the convoy based on the rotational position of the steering wheel; and
        display an image captured by the camera of the following vehicle on a display device of the lead vehicle.

2. The system of claim 1, wherein the machine-readable instruction to select the camera of the following vehicle comprises a machine-readable instruction that, when executed by the processor and when the steering wheel of the lead vehicle is in a leftward position, causes the processor to select a left side camera of the following vehicle.

3. The system of claim 1, wherein the machine-readable instruction to select the camera of the following vehicle comprises a machine-readable instruction that, when executed by the processor and when the steering wheel of the lead vehicle is in a rightward position, causes the processor to select a right-side camera of the following vehicle.

4. The system of claim 1, wherein the machine-readable instruction to display the image captured by the camera on the display device of the lead vehicle comprises a machine-readable instruction that, when executed by the processor, causes the processor to combine the image captured by the camera of the following vehicle with an image captured by a lead vehicle camera into a single image.

5. The system of claim 1, wherein the machine-readable instruction to select the camera of the following vehicle comprises a machine-readable instruction that, when executed by the processor, causes the processor to select multiple following vehicle cameras.

6. The system of claim 5, wherein the machine-readable instruction to display the image captured by the camera on the display device of the lead vehicle comprises a machine-readable instruction that, when executed by the processor, causes the processor to combine images from the multiple following vehicle cameras into a single image.

7. The system of claim 1, wherein:
    the machine-readable instruction to select the camera of the following vehicle comprises a machine-readable instruction that, when executed by the processor and when the steering wheel of the lead vehicle is in a central position, causes the processor to select multiple following vehicle cameras; and
    the machine-readable instruction to display the image captured by the camera on the display device of the lead vehicle comprises a machine-readable instruction that, when executed by the processor, causes the processor to generate and display a top view of the convoy based on the images from the multiple following vehicle cameras.

8. The system of claim 7, wherein the machine-readable instruction to generate and display a top view of the convoy comprises a machine-readable instruction that, when executed by the processor, causes the processor to combine the images captured by the multiple following vehicle cameras with images captured by multiple lead vehicle cameras into a single top view image.

9. A non-transitory machine-readable medium comprising instructions that, when executed by a processor, cause the processor to:
    detect a rotational position of a steering wheel of a lead vehicle of a convoy when the lead vehicle is in a reverse mode;
    select a camera of a following vehicle of the convoy based on the rotational position of the steering wheel; and
    display an image captured by the camera of the following vehicle on a display device of the lead vehicle.

10. The non-transitory machine-readable medium of claim 9, wherein the instruction to select a camera of a following vehicle comprises an instruction that, when executed by the processor, causes the processor to select a side camera of the following vehicle that matches the rotational position of the steering wheel of the lead vehicle.

11. The non-transitory machine-readable medium of claim 9, wherein the instruction to display the image captured by the camera on the display device of the lead vehicle comprises an instruction that, when executed by the processor, causes the processor to combine the image captured by the camera of the following vehicle with an image captured by a lead vehicle camera into a single image.

12. The non-transitory machine-readable medium of claim 9, wherein:
    the instruction to select the camera of the following vehicle comprises an instruction that, when executed by the processor and when the steering wheel of the lead vehicle is in a central position, causes the processor to select multiple following vehicle cameras; and the instruction to display the image captured by the camera on the display device of the lead vehicle comprises an instruction that, when executed by the processor, causes the processor to generate and display a top view of the convoy based on the images from the multiple following vehicle cameras.

13. The non-transitory machine-readable medium of claim 12, wherein the instruction to generate and display a top view of the convoy comprises an instruction that, when executed by the processor, causes the processor to combine the images captured by the multiple following vehicle cameras with images captured by multiple lead vehicle cameras into a single top view image.

14. The non-transitory machine-readable medium of claim 9, wherein:
the instruction to select the camera of the following vehicle comprises an instruction that, when executed by the processor, causes the processor to select multiple following vehicle cameras; and
the instruction to display the image captured by the camera on the display device of the lead vehicle comprises an instruction that, when executed by the processor, causes the processor to combine images from the multiple following vehicle cameras into a single image.

15. A method, comprising:
detecting a rotational position of a steering wheel of a lead vehicle of a convoy when the lead vehicle is in a reverse mode;
selecting a camera of a following vehicle of the convoy based on the rotational position of the steering wheel; and
displaying an image captured by the camera of the following vehicle on a display device of the lead vehicle.

16. The method of claim 15, wherein selecting a camera of a following vehicle comprises selecting a side camera of the following vehicle that matches the rotational position of the steering wheel of the lead vehicle.

17. The method of claim 15, wherein displaying the image captured by the camera on the display device of the lead vehicle comprises combining the image captured by the camera of the following vehicle with an image captured by a lead vehicle camera into a single image.

18. The method of claim 15, wherein:
selecting the camera of the following vehicle comprises, when the steering wheel of the lead vehicle is in a central position, selecting multiple following vehicle cameras; and
displaying the image captured by the camera on the display device of the lead vehicle comprises generating and displaying a top view of the convoy based on the images from the multiple following vehicle cameras.

19. The method of claim 18, wherein generating and displaying a top view of the convoy comprises combining the images captured by the multiple following vehicle cameras with images captured by multiple lead vehicle cameras into a single top view image.

20. The method of claim 15, wherein:
selecting the camera of the following vehicle comprises selecting multiple following vehicle cameras; and
displaying the image captured by the camera on the display device of the lead vehicle comprises combining images from the multiple following vehicle cameras into a single image.

\* \* \* \* \*